United States Patent
Lui

(10) Patent No.: US 11,420,782 B2
(45) Date of Patent: Aug. 23, 2022

(54) AUTOMATIC GROUND-COFFEE CAPSULE MANUFACTURING MACHINE

(71) Applicant: ATOM XQUARE LIMITED, Hong Kong (CN)

(72) Inventor: Ho Leung Lui, Hong Kong (CN)

(73) Assignee: ATOM XQUARE LIMITED, Hong Kong (CN)

( * ) Notice: Subject to any disclaimer, the term of this patent is extended or adjusted under 35 U.S.C. 154(b) by 533 days.

(21) Appl. No.: 16/466,971

(22) PCT Filed: Jul. 26, 2018

(86) PCT No.: PCT/IB2018/055585
§ 371 (c)(1),
(2) Date: Jun. 5, 2019

(87) PCT Pub. No.: WO2019/021231
PCT Pub. Date: Jan. 31, 2019

(65) Prior Publication Data
US 2020/0087011 A1    Mar. 19, 2020

(30) Foreign Application Priority Data

Jul. 28, 2017 (HK) .................................. 17107554.4
Nov. 24, 2017 (CN) ......................... 201711193648.5

(51) Int. Cl.
*B65B 29/02* (2006.01)
*A47J 42/26* (2006.01)
(Continued)

(52) U.S. Cl.
CPC ............. *B65B 29/022* (2017.08); *A47J 42/26* (2013.01); *A47J 42/28* (2013.01); *B65B 1/24* (2013.01);
(Continued)

(58) Field of Classification Search
None
See application file for complete search history.

(56) References Cited

U.S. PATENT DOCUMENTS

| 3,827,640 | A | * | 8/1974 | Marrie | ...................... H02K 7/14 |
|           |   |   |        |        | 241/100 |
| 2005/0077403 | A1 | * | 4/2005 | Yang | ........................ A47J 42/06 |
|           |   |   |        |        | 241/100 |

(Continued)

FOREIGN PATENT DOCUMENTS

| CN | 2745487 Y | 12/2005 |
| CN | 101404917 A | 4/2009 |

(Continued)

*Primary Examiner* — Hemant Desai
*Assistant Examiner* — Tanzim Imam
(74) *Attorney, Agent, or Firm* — Muncy, Geissler, Olds & Lowe, P.C.

(57) ABSTRACT

This invention involves with a kind of coffee machine, especially involves with a kind of automatic coffee grinding capsule making machine. The machine consists of the base, automatic rotating operation platform, coffee cup unloading device, coffee bean grinding device, coffee powder temporary storage device, powder tamping and removal device, coffee cap unloading device and capping device; the said automatic rotating operation platform is provided at the said base; the said automatic rotating operation platform can rotate based on the coffee capsule making status. This invention discloses the non-industrial and automatic coffee capsule maker that integrates coffee bean grinding, powder tamping and injection for capsule and capsule capping and improves the licensed process of such maker. This invention has more compact structure, smaller volume and lower cost, and can be operated simply and conveniently.

10 Claims, 9 Drawing Sheets

(51) Int. Cl.
*A47J 42/28* (2006.01)
*B65B 1/24* (2006.01)
*B65B 7/28* (2006.01)
*B65B 57/02* (2006.01)
*B65B 63/00* (2006.01)

(52) U.S. Cl.
CPC ............ *B65B 7/2807* (2013.01); *B65B 57/02* (2013.01); *B65B 63/00* (2013.01)

(56) References Cited

U.S. PATENT DOCUMENTS

| | | | | |
|---|---|---|---|---|
| 2016/0135646 | A1* | 5/2016 | Cacciamani | A47J 42/04 |
| | | | | 241/100 |
| 2017/0049263 | A1* | 2/2017 | Chiba | A23F 3/18 |
| 2017/0210499 | A1* | 7/2017 | Jensen | B65B 65/00 |
| 2017/0258272 | A1* | 9/2017 | Pai | A47J 42/02 |
| 2018/0125300 | A1* | 5/2018 | Lyn | A47J 42/40 |
| 2018/0318840 | A1* | 11/2018 | Devegili | A47J 42/06 |

FOREIGN PATENT DOCUMENTS

| | | |
|---|---|---|
| CN | 102970906 A | 3/2013 |
| CN | 202891620 U | 4/2013 |
| CN | 105030073 A | 11/2015 |
| CN | 105982551 A | 10/2016 |
| CN | 106580127 A | 4/2017 |
| EP | 1 440 642 A1 | 7/2004 |
| HK | 1242504 A | 6/2018 |
| WO | WO 2016/146422 A1 | 9/2016 |

\* cited by examiner

AUTOMATIC GROUND-COFFEE CAPSULE MANUFACTURING MACHINE

BACKGROUND OF THE INVENTION

Field of Invention

This invention involves with a kind of coffee machine, especially involves with a kind of automatic coffee grinding capsule making machine.

Description of Related Art

As for the automatic coffee grinding capsule making machine adopting the existing technology, there are only coffee capsules of different brands/sizes and tastes for sale. For most out of these capsules, the brand manufacturers make several kinds of coffee capsules with the single taste respectively through massive production. In addition, there are very little amount of coffee capsules made by the users independently for personal taste. If the capsules made by the brand manufacturers are bought, the user does not have choice to select the coffee taste. In addition, one-time use is not environment-friendly. However, if the user makes coffee capsules independently for personal taste, there are many operating procedures, operation is complex, it takes a lot of time and it is easily dirty.

SUMMARY OF THE INVENTION

For the defect or deficiency of the existing technology, this invention desires to resolve the following technical problem, namely this invention will provide a kind of automatic coffee maker that can resolve the technical problem of the existing technology that the coffee maker only makes coffee with single taste and the operating procedure is complex.

For achieving the purpose above, this invention adopts the following technical proposal, namely a kind of automatic coffee grinding capsule making machine can be provided. The said maker consists of the base, automatic rotating operation platform, coffee cup unloading device, coffee bean grinder device, coffee powder temporary storage device, powder tamping and removal device, coffee cap unloading device and capping device; the said automatic rotating operation platform is provided at the said base; the said automatic rotating operation platform can rotate based on the coffee capsule making status; there are several first holes at the said automatic rotating operation platform, and there are several first detecting devices below the said automatic rotating operation platform; the said first holes are used for bearing the coffee cup; the said first detecting devices are used for detecting the working position of the coffee cup at the automatic rotating operation platform; the said coffee bean grinder device, the said coffee powder temporary storage device, the said powder pressing and removal device, the said coffee cup unloading device, the said coffee cap unloading device and the said capping device are fixed to the said base; the said coffee bean grinder device consists of the coffee bean storage bunker, the first motor, rotating shaft, grinder burr assembly, coffee powder collector and powder scraper; the said first motor is transversely fixed and connected to the said rotating shaft. The said coffee bean storage bunker, the said grinder burr assembly and the said powder scraper are fixed to the said rotating shaft in turn and toward the direction away from the first motor. The said powder scraper is fixed to the end of the said rotating shaft; the said powder scraper is inside the said coffee powder collector.

As the further improvement of this invention, the said grinder burr assembly consists of the grinder burr bracket, the first burr and the second burr. The said grinder burr bracket is vertically fixed to the said rotating shaft. The said first burr and the second burr can be dismantled from and fixed to the said grinder burr bracket respectively.

As the further improvement of this invention, the said coffee grinder device also consists of the grinder burr interval regulator. The said grinder burr interval regulator is used for regulating the distance between the grinder burr and regulating the fineness of the milled coffee powder.

As the further improvement of this invention, there is a first spring at the lower part of the said coffee bean storage bunker. The said first spring is nested to the said rotating shaft. One end of the said first spring is connected to the said coffee bean storage bunker, and the other end of the said first spring is connected to the said grinder burr assembly.

As the further improvement of this invention, the said coffee powder temporary storage device consists of a second motor, a second detecting device and a movable mechanical part; the said second motor is used for driving the movement of the said movable mechanical part; the said second detecting device is used for detecting whether the said movable mechanical part is in place or not; inside the said movable mechanical part, there is a volume-changeable cylinder cavity. The said cylinder cavity is used for placing the coffee powder conveyed from the said coffee powder collector. When the said cylinder cavity is filled with coffee powder, the said second motor will drive the said movable mechanical part to move. Wherein, as for the specific method for changing the said volume, the temporary storage devices or assemblies with different fixed volumes can be replaced.

As the further improvement of this invention, the said powder tamping and removal device consists of the third motor, the third detecting device, the second spring, powder tamper, flat scraper and a waste storage bin; the said third motor is connected to the said powder tamper, and the said second spring is nested to the said powder tamper; the said third motor is used for driving the said powder tamper to move upward or downward; the said third detecting device is used for detecting whether the powder tamper is in place or not; the said second spring is used for buffering the pressure exerted by the said third motor on the said powder tamper. The said flat scraper is used for removing the redundant coffee powder outside the coffee cup; the said waste storage bin is used for storing the discarded coffee powder.

As the further improvement of this invention, the said coffee cap unloading device consists of a fourth motor, the fourth detecting device, a push rod, coffee cap tray and a sliding track; the said fourth motor drives the said push rod and makes the coffee cap to move along the said sliding track and cap the coffee cup; the said fourth detecting device is used for detecting whether there is coffee cap on the coffee cap tray or not.

As the further improvement of this invention, the said capping device consists of a drum, roller, the third spring and a connection device; the said roller is provided at both ends of the said drum, and the said roller is connected to the said connection device via the said third spring.

As the further improvement of this invention, the said drum consists of the first drum and the second drum; the said first drum covers outside the said second drum; the said first drum is made of soft rubber; the said second drum is made of hard rubber; when the coffee cap caps the coffee cup, the said capping device will press the said coffee cap.

As the further improvement of this invention, the said coffee cup unloading device consists of a fifth motor, the fifth detecting device, a unloading mechanism and coffee cup tray; via the unloading mechanism the said fifth motor pushes the coffee cup on the coffee cup tray to fall into the said first hole; the fifth detecting device is used for detecting whether there is coffee cup on the coffee cup tray or not.

Beneficial effects of this invention: This invention discloses the non-industrial and automatic coffee grinding capsule making machine that integrates coffee bean grinding, powder tamping and injection for capsule and capsule capping and improves the licensed process of such maker. This invention has more compact structure, smaller volume and lower cost, and can be operated simply and conveniently.

Figure 1:
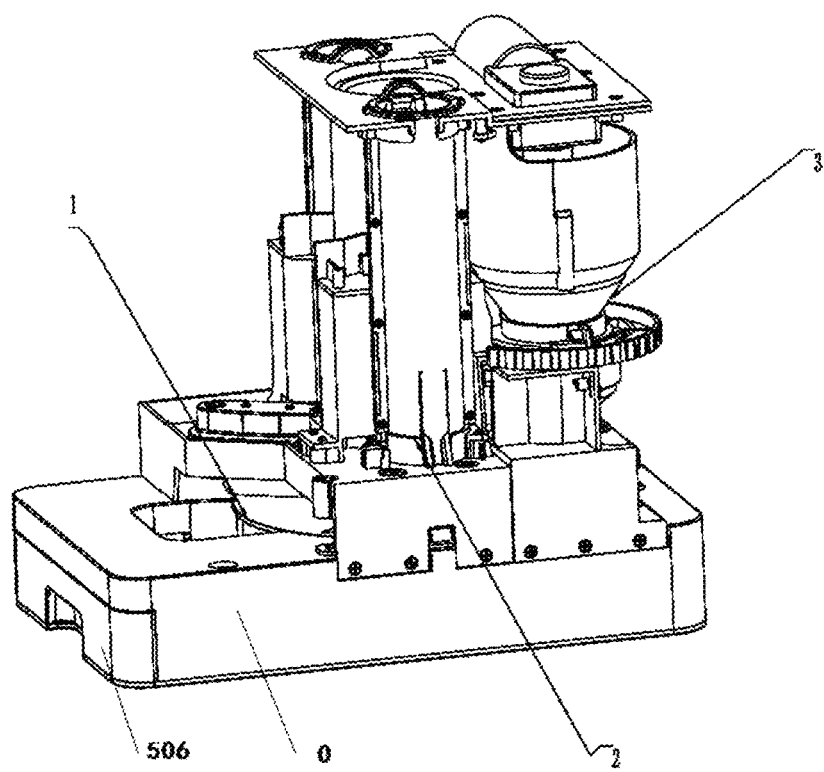
FIG. 1 shows the structure schematic diagram provided by this invention.

Where, the numbers represent the following means: base 0;

Automatic rotating operation platform 1; rotating disc 101; first detecting device 102; stepping motor 103;

Coffee cup unloading device 2; the fifth motor 201; the fifth detecting device 202; unloading mechanism 203;

Coffee bean grinder device 3; the first motor 301; motor connector 302; rotating shaft 303; coffee bean storage bunker 304; the first grinder burr 305a; the second grinder burr 305b; grinder burr bracket 305c; the grinder burr interval regulator 306; the coffee powder collector 307; fastening screw 308; powder scraper 309; the first gear 310a; the second gear 310b;

Coffee powder temporary storage device 4; the second motor 401; the second detecting device 402; movable mechanical part 403;

Powder tamping and removal device 5; the third motor 501; the third detecting device 502; the second spring 503; powder tamper 504; flat scraper 505; waste storage bin 506;

Coffee cap unloading device 6; the fourth motor 601; the fourth detecting device 602; sliding track 603;

Capping device 7; drum 700; roller 701; the first drum 703; the second drum 704;

Coffee capsule 8; coffee cap 801; coffee cup 802.

DETAIL DESCRIPTION OF THE INVENTION

In the following, this invention will be further illustrated with the description of attached diagrams and specific embodiments.

Figure 2:
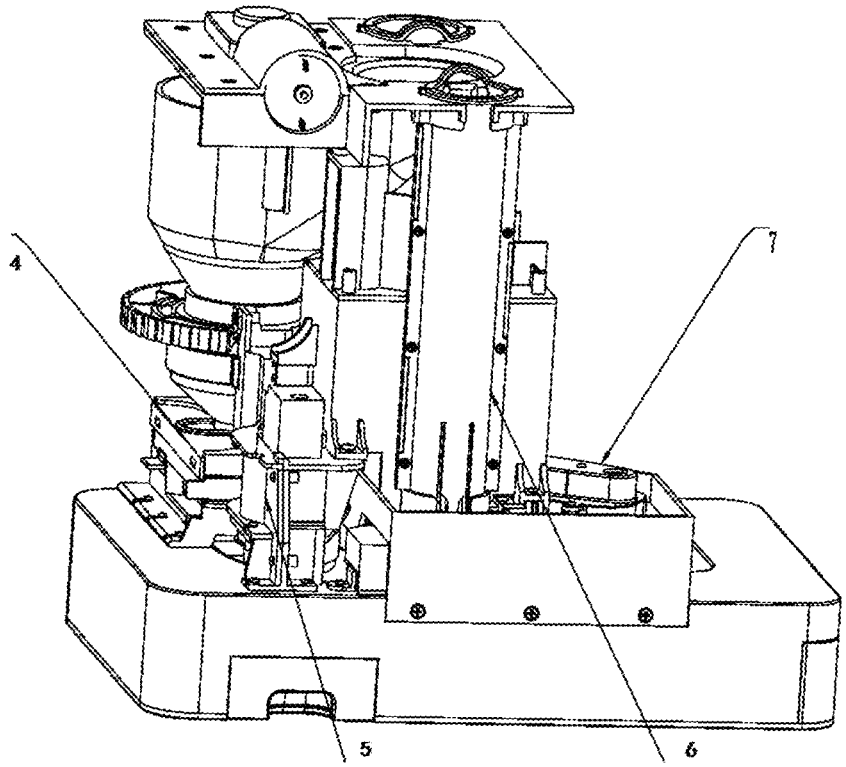
FIG. 2 shows the structure schematic diagram of the other side provided by this invention.
Figure 5:
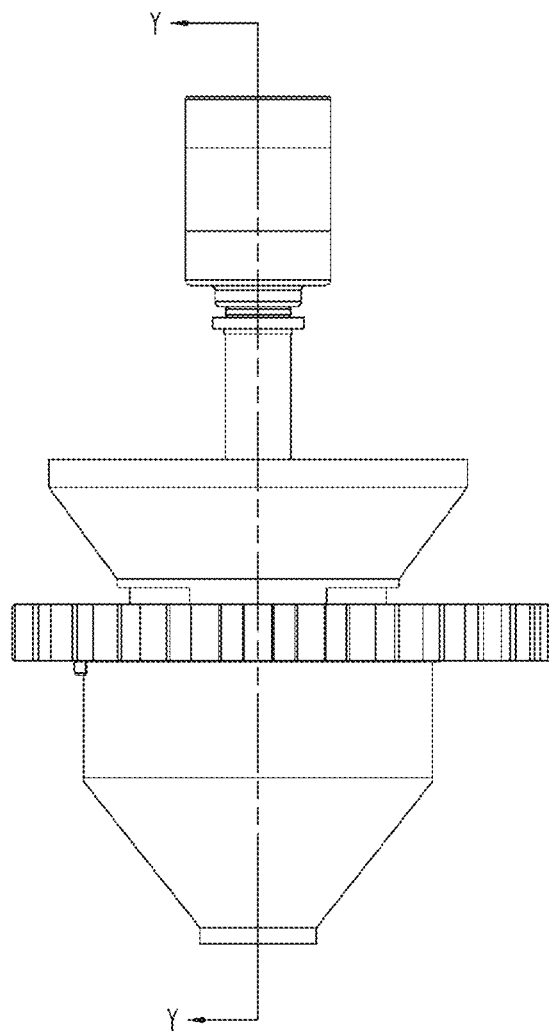
FIG. 5 shows the front view of the part marked with "3" in FIG. 1 provided by this invention.

As shown in FIGS. 1-2, this invention provides a kind of automatic coffee grinding capsule making machine that is used for making coffee capsules, tea capsules or red bean capsules. The operating steps for making tea capsules and red bean capsules are essentially same to those for making coffee capsules. The grinder device is used for powdergrinding, and then the capsules are made with such powder; in addition, the maker is not limited to making tea capsules and red bean capsules, and can also be used for making other beverage or food capsules. The said automatic coffee grinding capsule making machine consists of the base 0, automatic rotating operation platform 1, coffee cup unloading device 2, coffee bean grinder device 3, coffee powder temporary storage device 4, powder tamping and removal device 5, coffee cap unloading device 6 and capping device 7; the said automatic rotating operation platform 1 is provided at the said base 0; the said automatic rotating operation platform 1 can rotate based on the coffee capsule making status; there are several first holes at the said automatic rotating operation platform 1, and there are several first detecting devices 102 below the said automatic rotating operation platform 1; the said first holes are used for bearing the coffee cup 802; the said first detecting devices 102 are used for detecting the working position of the coffee cup 802 at the automatic rotating operation platform 1; the said coffee cup unloading device 2, the said coffee bean grinder device 3, the said coffee powder temporary storage device 4, the said powder tamping and removal device 5, the said coffee cap unloading device 6 and the said capping device 7 are fixed to the said base 0; as shown in FIG. 5, the said coffee bean grinding device 3 consists of the coffee bean storage bunker 304, the first motor 301, rotating shaft 303, grinder burr assembly, coffee powder collector 307 and powder scraper 309; the said first motor 301 is transversely fixed and connected to the said rotating shaft 303. The said coffee bean storage bunker 304, the said grinder burr assembly and the said powder scraper 309 are fixed to the said rotating shaft 303 in turn and toward the direction away from the first motor 301. The said powder scraper 309 is fixed to the end of the said rotating shaft 303; the said powder scraper 309 is inside the said coffee powder collector 307.

Figure 6:
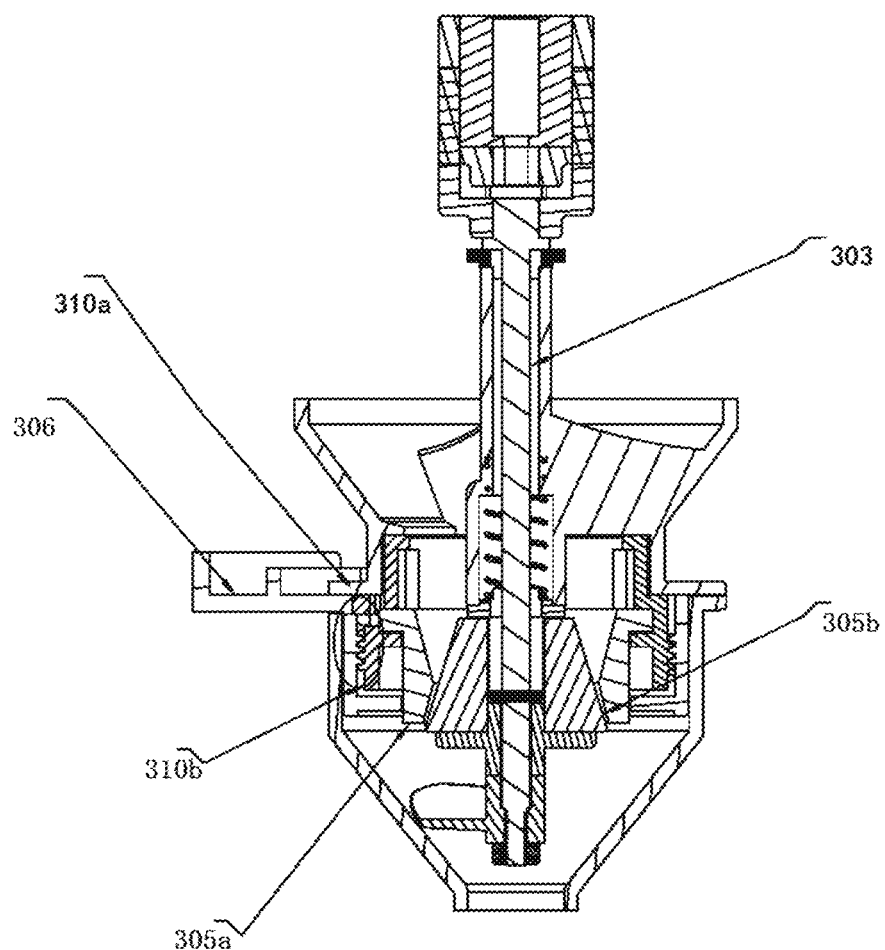
FIG. 6 shows the sectional view along Y-Y in FIG. 5 provided by this invention.
Figure 7:
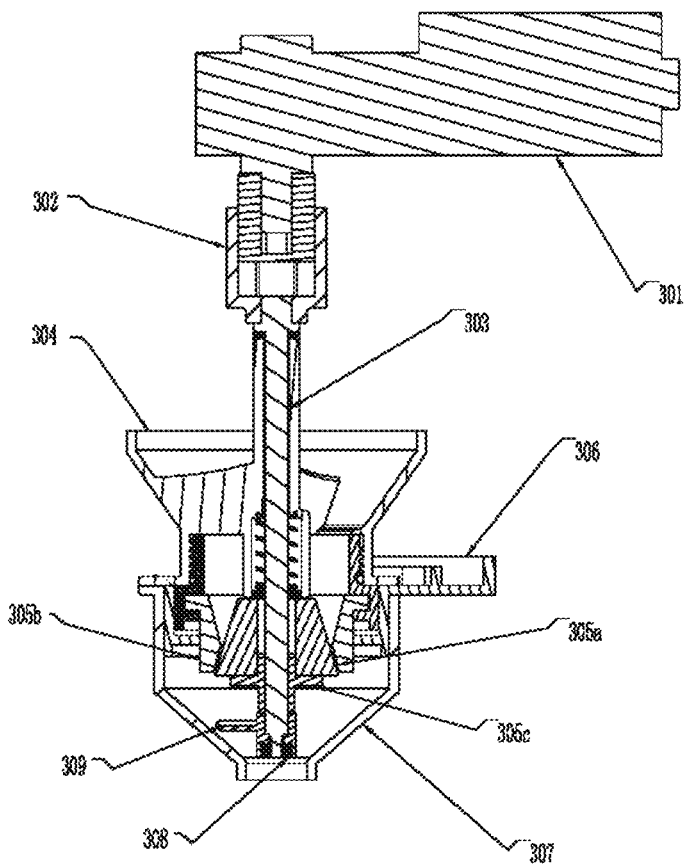
FIG. 7 shows the another sectional view of the part marked with "3" in FIG. 1 provided by this invention.

Inside the ordinary grinder machine, the motor is vertical, and the motor and the grinder burr are connected at the same axle center. The torsion force requirement for the motor can be reduced by some degree. There are the following shortcomings: for domestic use, if the burr is removed for cleaning, the removal flow is very complex. In addition, in case of improper assembly, the whole grinding part is very easily damaged. Thus, as shown in FIGS. 5-7, the first motor 301 is designed to partially form a right angle with the axle center of the rotating shaft 303 and burr. In addition, the problem of torsion force reduction is compensated through gear design in some proportion.

Wherein, the said grinder burr assembly consists of the grinder burr bracket 305c, the first grinder burr 305a and the second grinder burr 305b. The said grinder burr bracket 305c is vertically fixed to the said rotating shaft 303. The said first grinder burr 305a and the second grinder burr 305b can be dismantled from and fixed to the said grinder burr bracket 305c respectively. The interval between the said first grinder burr 305a and the second grinder burr 305b can be regulated; the said coffee grinder device also consists of the grinder burr interval regulator 306. The said grinder burr interval regulator 306 is used for regulating the distance between the grinder burrs and regulating the fineness of the ground coffee powder. With the said grinder burr interval regulator 306, the interval between the grinder burr can be regulated; the distance between the grinder burr can be regulated through regulating the engagement degree between the gear 310a and gear 310b. Specifically, the said grinder burr interval regulator 306 consists of the first gear 310a and the second gear 310b; when it needs to regulate the interval between grinder burrs, the said grinder burr interval regulator 306 is pushed/rotated, the first gear 310a and the second gear 310b match (similar to thread matching) and drive rotation, the second gear 310b pushes the grinder burr 305a and makes the grinder burr 305a to move upward/downward along the rotating shaft in order to achieve the purpose of regulating the interval between the first grinder burr 305a and the second grinder burr 305b. There is a motor connector 302 between the said first motor 301 and the said rotating shaft 303. If the said motor connector 302 is moved upward, the said first motor 301 will be directly separated from the rotating shaft 303; at the end of the said rotating shaft 303, there is also a fastening screw 308. If the said fastening screw 308 is dismantled, the said powder scraper 309 can be removed, and then the grinder burr interval regulator 306 and milling knife assembly can be removed, and finally the said coffee bean storage bunker 304 can be removed. There is a first spring below the said coffee bean storage bunker 304. The said first spring is nested to the said rotating shaft 303. One end of the said first spring is connected to the said coffee bean storage bunker 304, and the other end of the said first spring is connected to the said grinder burr assembly.

Figure 3:
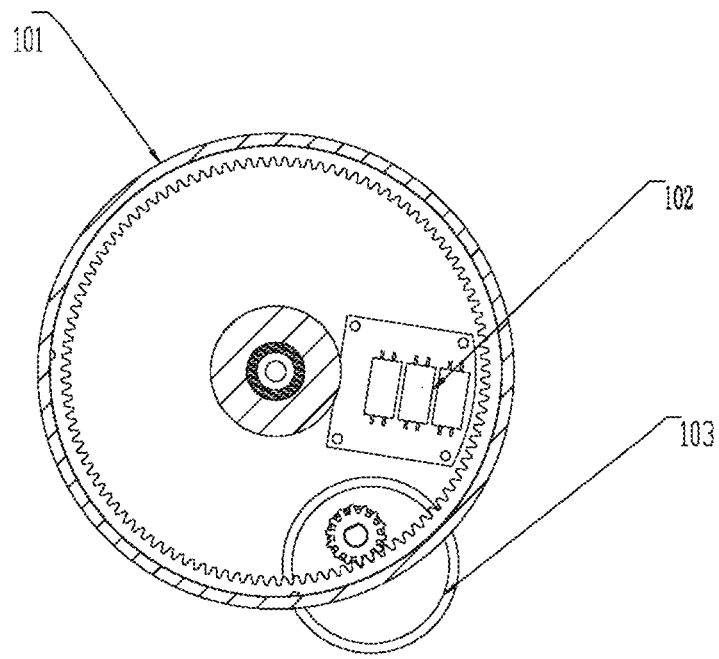
FIG. 3 shows the schematic diagram of the part marked with "1" in FIG. 1 provided by this invention.

As shown in FIG. 3, there is a stepping motor 103 for driving purpose below the said automatic rotating operation platform 1. The said stepping motor 103 engages with the gear at the said automatic rotating operation platform 1 via a gear. Specifically, the said automatic rotating platform consists of a rotating disc 101, the said stepping motor 103 drives the said rotating disc 101 to rotate via the gear, the said first holes are provided at the said rotating disc 101; at one side of the said stepping motor 103, there is a first detecting device 102 which is a infrared detector. The said detector is used for detecting whether there is coffee cup 802 in the said first hole or not and detecting the working position of the coffee cup 802 at the said automatic rotating platform. In addition, the set operations (such as powder injection, powder tamping and so on) can be conducted.

Figure 4:
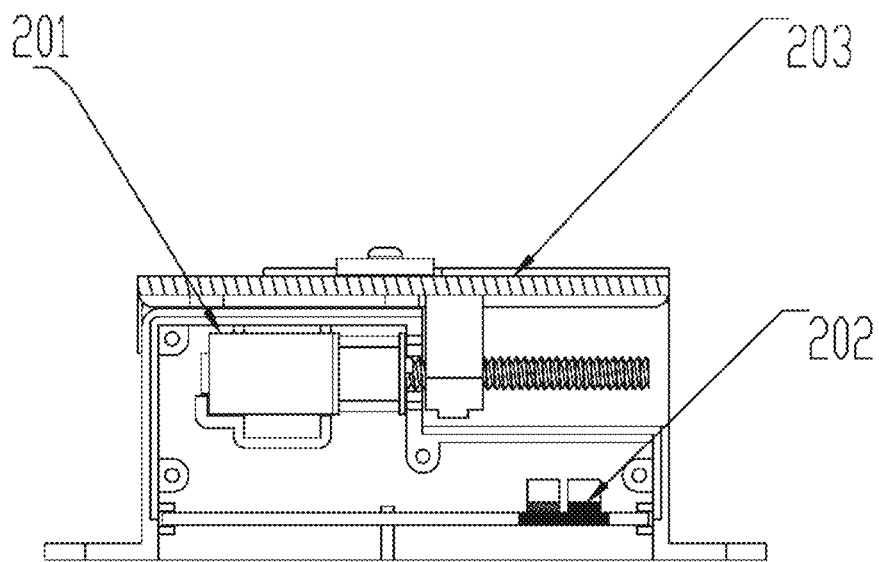
FIG. 4 shows the section of the part marked with "2" in FIG. 1 provided by this invention.

As shown in FIG. 4, the said coffee cup unloading device 2 consists of a fifth motor 201, the fifth detecting device 202, a unloading mechanism 203 and coffee cup tray; via the unloading mechanism 203, the said fifth motor 201 pushes the coffee cup 802 on the coffee cup tray to fall into the said first hole; the fifth detecting device 202 is used for detecting whether there is coffee cup 802 on the coffee cup tray or not. Specifically, inside the coffee cap unloading device 6, the said fourth detecting device 602 consists of 3 detecting modules. Wherein, two detecting modules are used for detecting the position of the said push rod. The third detecting module is used for detecting whether there is coffee cup 802 on the coffee cup tray or not.

While grinding the powder, the coffee beans from the coffee bean storage bunker 304 enter between the grinder burr for being grinded. Wherein, there is a current detecting device in the said coffee bean grinder device 2. The current detecting device is used for detecting whether there are coffee beans between the grinder burrs or not. If there is no coffee bean, the user will be notified to add the coffee beans or stop operation. The detecting method is described as follows: The said current detecting device is used for detecting the motor current to determine whether there are coffee beans in the grinder machine device or not. The powder grinded with coffee beans enters the said coffee powder collector 307 for storage. Then, with the rotation effect of the said powder scraper 309, the coffee powder enters the coffee powder temporary storage device 4.

Figure 8:
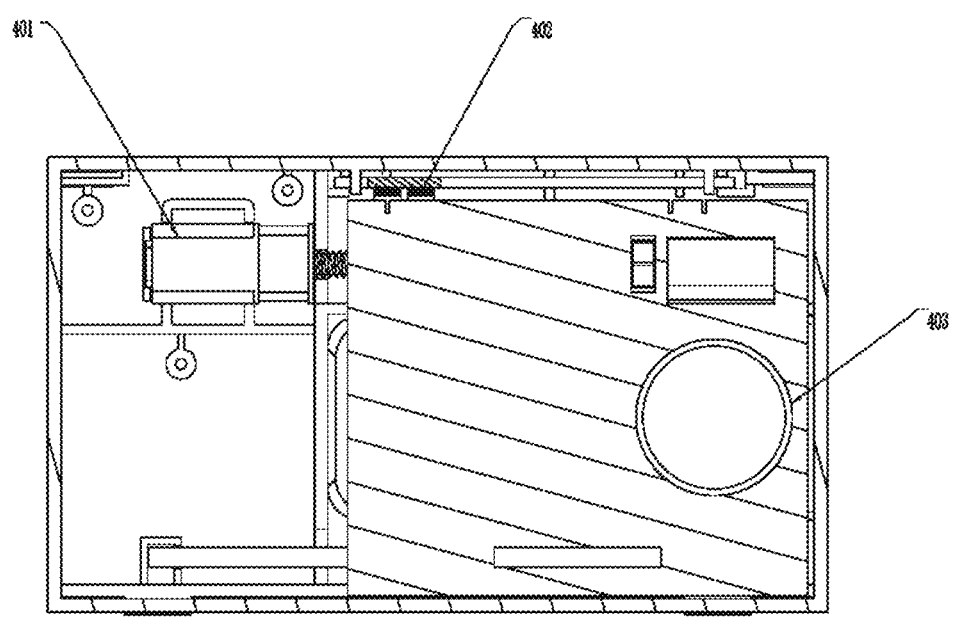
FIG. 8 shows the structure schematic diagram of the part marked with "4" in FIG. 2 provided by this invention.

As shown in FIG. 8, the said coffee powder temporary storage device 4 consists of a second motor 401, a second detecting device 402 and a movable mechanical part 403; the said second motor 401 is used for driving the movement of the said movable mechanical part 403; the said second detecting device 402 is used for detecting whether the said movable mechanical part 403 is in place or not; inside the said movable mechanical part 403, there is a volume-changeable cylinder cavity. The said cylinder cavity is used for placing the coffee powder conveyed from the said coffee powder collector 307. When the said cylinder cavity is filled with coffee powder, the said second motor 401 will drive the said movable mechanical part 403 to move. The user can change size of the cylinder cavity or replace such cavity to change the packaging volume of the coffee capsule 8.

Before grinding, the said coffee powder temporary storage device 4 waits at the outlet of the said coffee powder collector 307. When the grinder motor starts up, the powder scraper 309 rotates and pushes the coffee powder to the coffee powder temporary storage device 4; when the coffee powder temporary storage device 4 is filled, the coffee powder temporary storage device 4 will move from the coffee powder outlet of the coffee powder collector 307 to the position above the coffee cup 802. With the automatic rotating operation platform 1, the filled coffee cup 802 moves to the position below the said powder tamping and removal device 55 for powder tamping and powder scraping operations.

Figure 9:
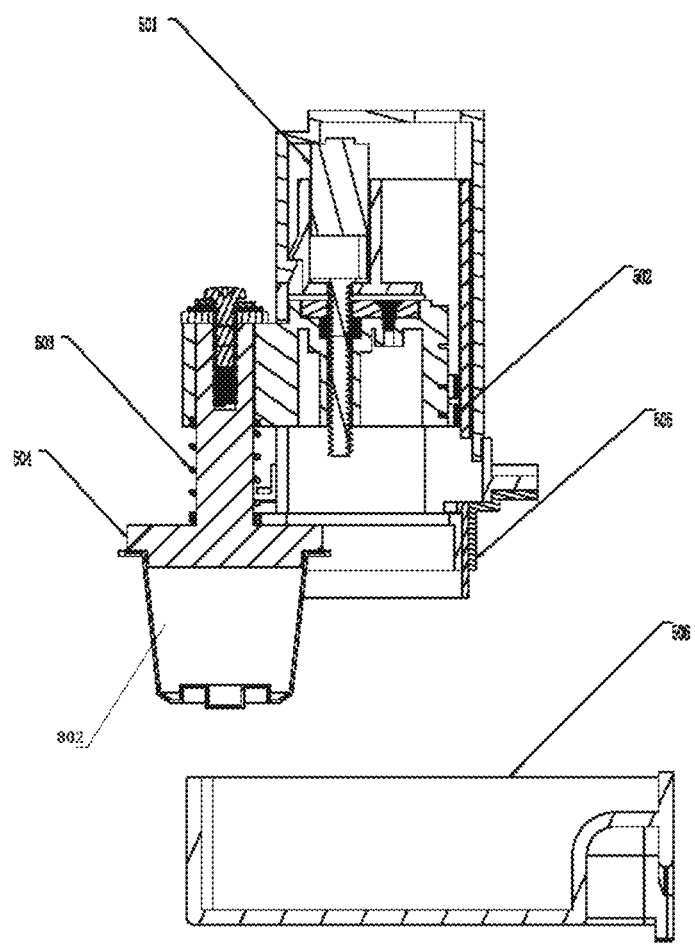
FIG. 9 shows the sectional view of the part marked with "5" in FIG. 2 provided by this invention.

As shown in FIG. 9, the said powder tamping and removal device 5 consists of the third motor 501, the third detecting device 502, the second spring 503, powder tamper 504, flat scraper 505 and a waste storage bin 506; the said third motor 501 is connected to the said powder tamper 504, and the said second spring 503 is nested to the said powder tamper 504; the said third motor 501 is used for driving the said powder tamper 504 to move upward or downward; the said third detecting device 502 is used for detecting whether the powder tamper 504 is in place or not; the said third detecting device 502 consists of two position sensors which are provided at the one side of or inside the said powder tamping and removal device 5 to achieve the purpose of detecting the position of the powder tamper 504; the said second spring 503 is used for buffering the pressure exerted by the said third motor 501 on the said powder tamper 504 and preventing that the powder tamper 504 directly presses on and damages the coffee cup 802. The said flat scraper is used for removing the redundant coffee powder outside the coffee cup 802; the said waste storage bin 506 is used for storing the discarded coffee powder.

Figure 10:
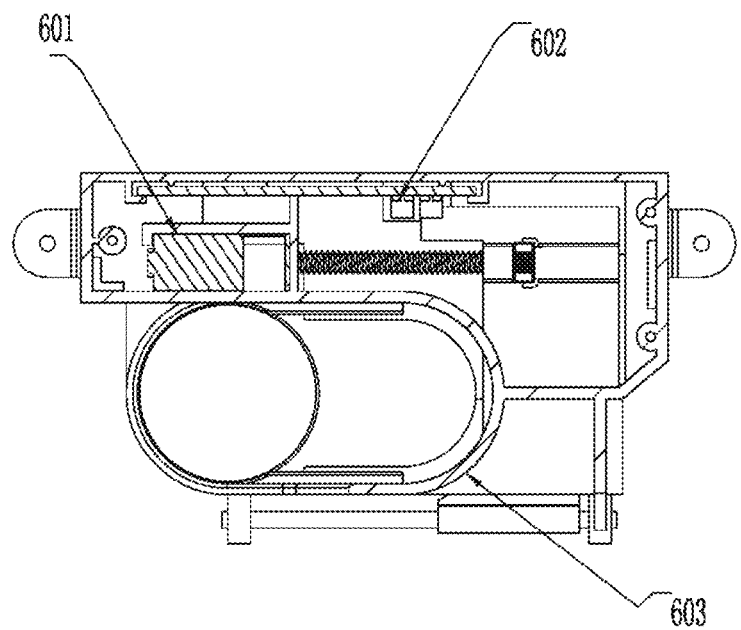
FIG. 10 shows the structure schematic diagram of the part marked with "6" in FIG. 2 provided by this invention.
Figure 11:
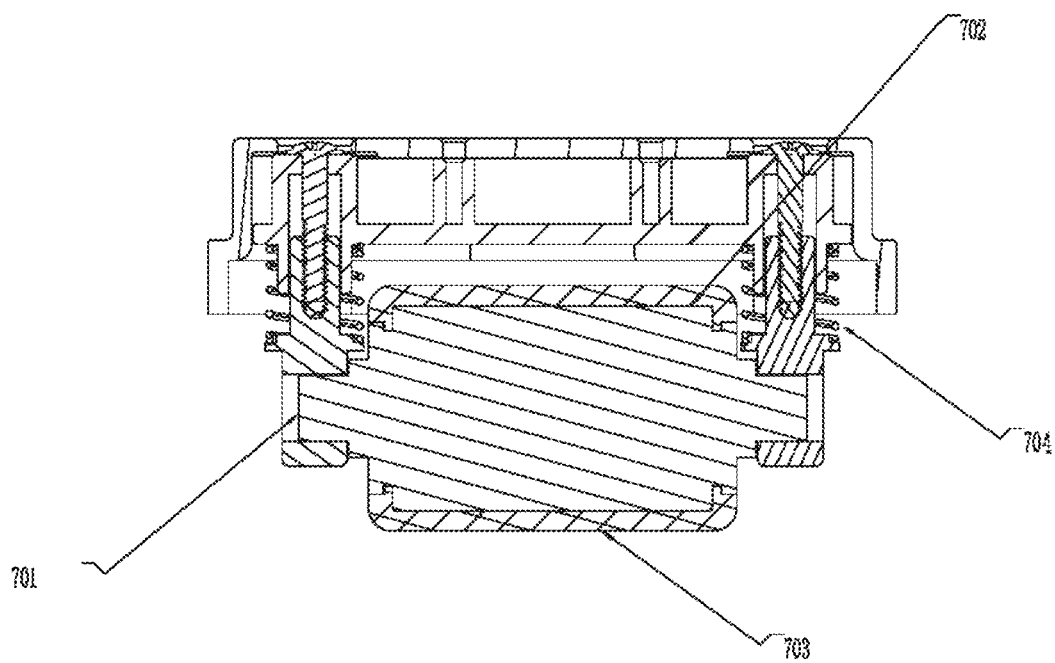
FIG. 11 shows the sectional view of the part marked with "7" in FIG. 2 provided by this invention.
Figure 12:
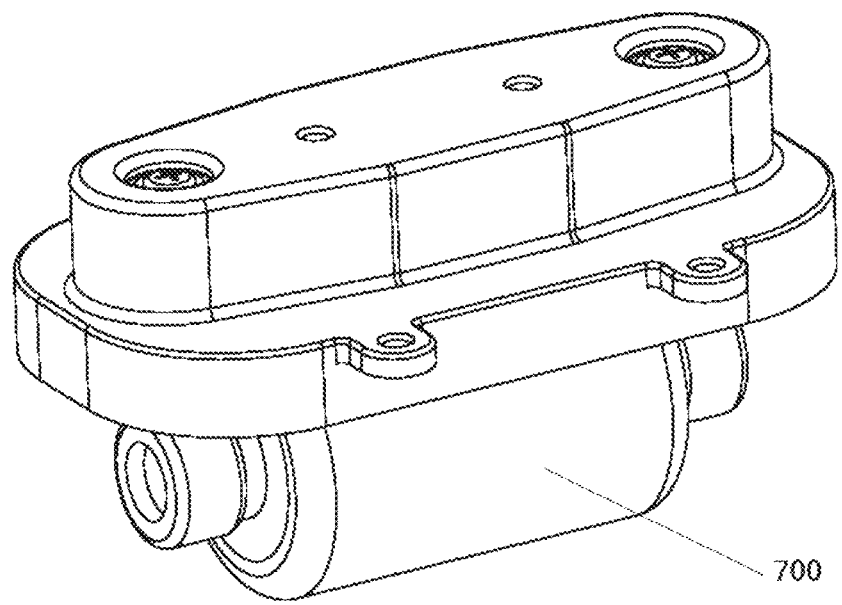
FIG. 12 shows the structure schematic diagram of the part marked with "7" in FIG. 2 provided by this invention.
Figure 13:
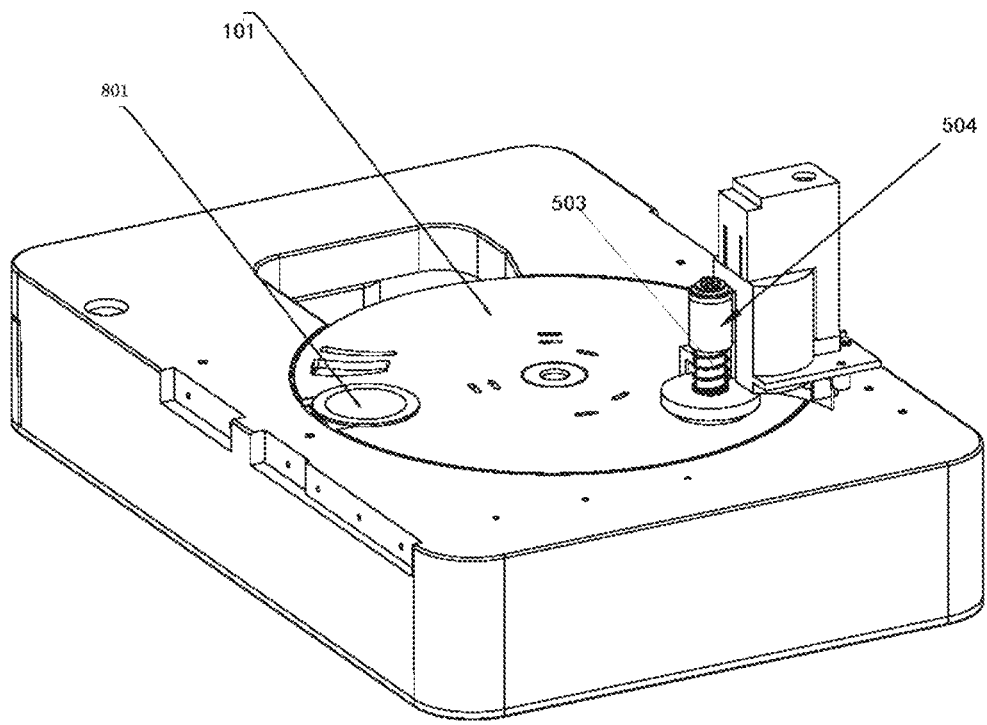
FIG. 13 shows the working schematic diagram of the part marked with "5" in FIG. 2 provided by this invention.
Figure 14:
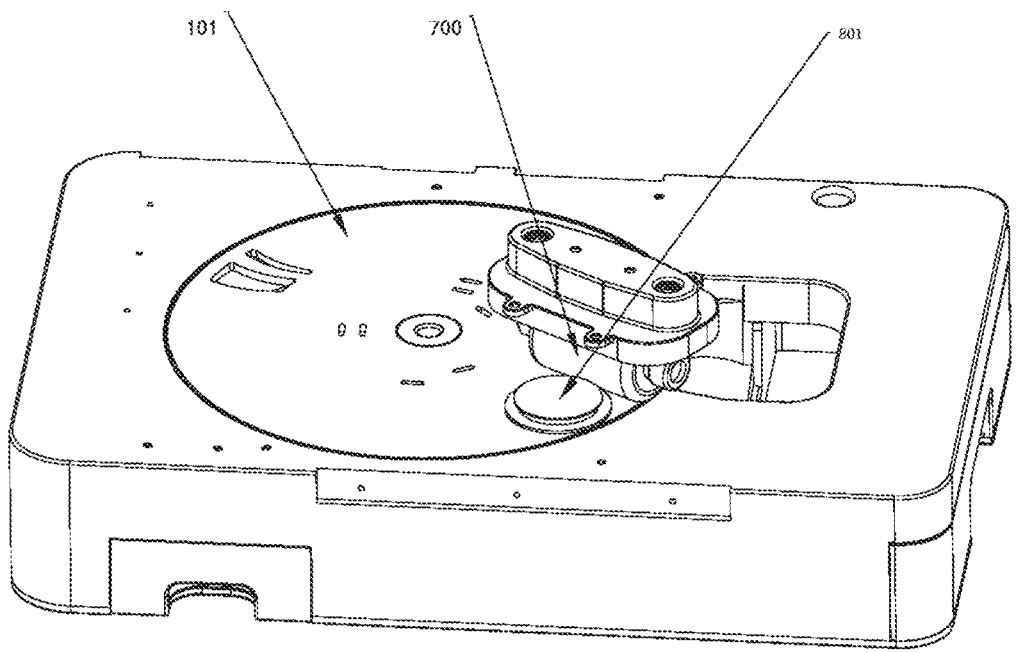
FIG. 14 shows the working schematic diagram of the part marked with "7" in FIG. 2 provided by this invention.
Figure 15:
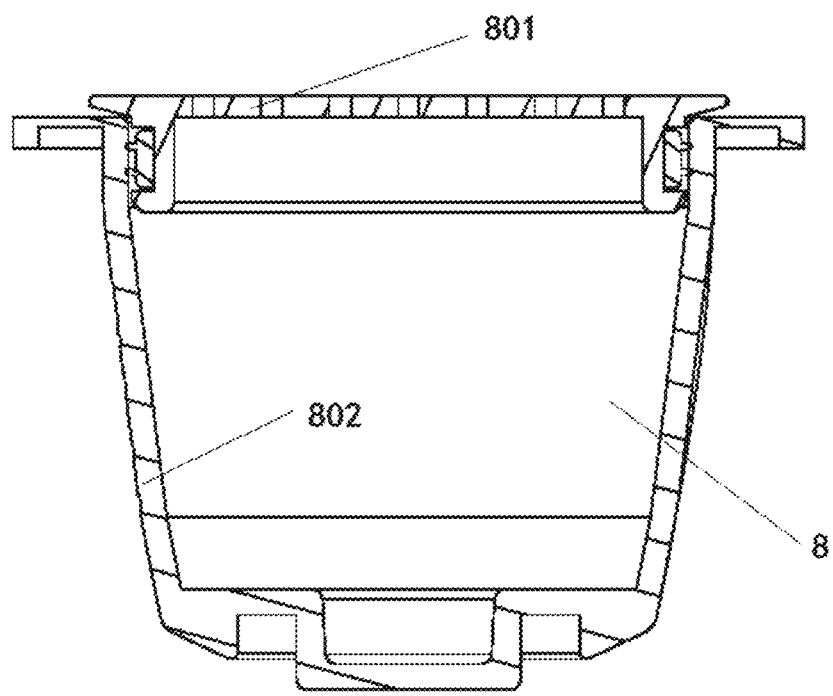
FIG. 15 shows the longitudinal sectional view of the coffee capsule provided by this invention.

As shown in FIG. 10, the said coffee cap unloading device 6 consists of a fourth motor 601, the fourth detecting device 602, a push rod, coffee cap tray and a sliding track 603; the said fourth motor 601 drives the said push rod and makes the coffee cap 801 to move along the said sliding track 603 and cap the coffee cup 802; the said fourth detecting device 602 is used for detecting whether there is coffee cap 801 on the coffee cap tray or not.

The said capping device 7 consists of a drum 700, roller 701, the third spring and a connection device; the said roller 701 is provided at both ends of the said drum 700, and the said roller 701 is connected to the said connection device via the said third spring. The said drum 700 consists of the first drum 702 and the second ruin 703; the said first drum 702 covers outside the said second drum 703; the said first drum 702 is made of soft rubber; the said second drum 703 is made of hard rubber; when the coffee cap 801 caps the coffee cup 802, the said capping device 7 will press the said coffee cap 801.

This invention adopts the design of the capping device, and the embedded and independent metal cap design will be utilized. Thus, certain pressure is required for assembly. The pressure will be vertically exerted from the position above the coffee cap 801 to the position below the coffee cap 801, and it shall also ensure that the entire coffee cap 801 will be pressed by the drum 700. Thus, the said drum 700 presses the entire coffee cap 801, which is similar to that the road roller rolls the road. Wherein, there is a rubber ring at the sealed junction between the said coffee cup 802 and the said coffee cap 801. The said rubber ring can ensure that the coffee capsule is airtight and still remains airtight when being made and pressed.

In addition, the coffee capsule adopts the unique design. The inlet of the coffee capsule is injected, moulded and formed to be in trapezoidal sharp. Thus, when the metal cap is embedded into the coffee capsule, the material at the inlet of the coffee capsule will be forcibly expanded, the coffee cap 801 and the coffee cup 802 will mutually sleeve and will not separate. The metal cap and the coffee cup 802 adopt the self-airtight design, they will be heated by the drum type capping device. When the metal cap is pressed down, its side convex groove will engage with the top concave groove of the capsule. A little amount of binding agent is added at the side groove of the capsule, when the metal cap is heated, the binding agent will dissolve, the boundaries of the coffee cap 801 and the coffee cup 802 will mutually fuse to achieve the air-tight purpose.

A kind of method for making the coffee capsule, the steps are described as follows:

Placing the coffee cup: When the control system detects that there is empty coffee cup 802 on the coffee cup tray, the empty coffee cup 802 will be placed on the automatic rotating operation platform 1;

Powder grinding: The control system controls the coffee beans to fall into the grinder burr assembly for grinding the coffee beans to be powder. The ground coffee powder will be temporarily stored in the coffee powder collector 307;

Powder injection: With the powder scraper 309, the coffee powder is scraped into the coffee powder temporary storage device 4. The coffee powder temporary storage device 4 moves to the position above the empty coffee cup 802 and unloads the coffee powder into the empty coffee cup 802;

Powder tamping: With rotation of the automatic rotating operation platform 1, the coffee cup 802 filled with coffee powder moves to the position below the powder tamping and removal device 5. With the powder tamper 504, the said powder tamping and removal device 5 presses the coffee powder in coffee cup 802 from up to down;

Powder scraping: With the flat scraper 505, the redundant coffee powder outside the coffee cup 802 will be scraped to the waste storage bin 506;

Encapsulating: After powder scraping, with rotation of the automatic rotating operation platform 1, the coffee cup 802 moves to the position below the coffee cap unloading device 6. With the said coffee cap unloading device 6, the coffee cap 801 is capped to the coffee cup 802;

Capping: The control system controls the capping device 7 to roll on the encapsulated coffee cup 801 for capping;

Push-out: After capping, the automatic rotating operation platform 1 continuously rotates, the capped coffee cup falls into the finished-product compartment.

Wherein, the steps before the powder grinding are described as follows:

The grinder burr interval regulator 307 is regulated to control the interval between grinder burrs and regulate the fineness of the coffee powder.

The information above is further and detailed description of this invention with the specific and preferred embodiments. It cannot determine that the specific embodiments of this invention are limited to such description. For the ordinary technical personnel of this field of this invention, on the premise that conception of this invention is not deviated, several simple evolutions or replacements can be made, and such evolutions or replacements shall be within the protection scope of this invention.

What is claimed is:

1. An automatic coffee grinding capsule making machine, comprising:
    a base,
    an automatic rotating operation platform,
    a coffee cup unloading device,
    a coffee bean grinding device,
    a coffee powder temporary storage device,
    a powder tamping and removal device, and
    a coffee cap unloading device, and a capping device;
    wherein the automatic rotating operation platform is provided at the base; wherein the automatic rotating operation platform can rotate based on a coffee capsule making status; wherein there are several first holes at the automatic rotating operation platform, and there are several first detecting devices below the automatic rotating operation platform; wherein the first holes are used for bearing a coffee cup; wherein the first detecting devices are used for detecting the working position of the coffee cup at the automatic rotating operation platform; wherein the coffee bean grinding device, the coffee powder temporary storage device, the powder tamping and removal device, the coffee cup unloading device, the coffee cap unloading device, and the capping device are fixed to the base;
    wherein the coffee bean grinding device comprises a first motor, a coffee bean storage bunker, a rotating shaft, a grinder burr assembly, a coffee powder collector, and a powder scraper; wherein the first motor is transversely fixed and connected to the rotating shaft;
    wherein the coffee bean storage bunker, the grinder burr assembly and the powder scraper are fixed to the rotating shaft in turn and toward a direction away from the first motor;
    wherein the powder scraper is fixed to an end of the rotating shaft; and wherein the powder scraper is inside the coffee powder collector.

2. The automatic coffee grinding capsule making machine of claim 1, wherein the grinder burr assembly comprises a burr bracket, a first burr, and a second burr, wherein the burr bracket is vertically fixed to the rotating shaft, and wherein the first burr and the second burr can each be dismantled from and fixed to the burr bracket.

3. The automatic coffee grinding capsule making machine of claim 2, wherein the grinder burr assembly comprises a grinder burr interval regulator, and wherein the grinder burr interval regulator is used for regulating a distance between the first burr and the second burr and regulating a fineness of ground coffee.

4. The automatic coffee grinding capsule making machine of claim 3, wherein there is a first spring at a lower part of the coffee bean storage bunker, wherein the first spring is mounted around the rotating shaft, and wherein one end of the first spring is connected to the coffee bean storage bunker, and another end of the first spring is connected to the grinder burr assembly.

5. The automatic coffee grinding capsule making machine of claim 1, wherein the coffee powder temporary storage device comprises a second motor, a second detecting device, and a movable mechanical part; wherein the second motor is used for driving movement of the movable mechanical part; wherein the second detecting device is used for detecting whether the movable mechanical part is in place or not; wherein inside the movable mechanical part, there is a volume-changeable cylinder cavity; wherein the cylinder cavity is used for placing coffee powder conveyed from the coffee powder collector; and wherein when the cylinder cavity is filled with coffee powder, the second motor drives the movable mechanical part to move.

6. The automatic coffee grinding capsule making machine of claim 5, wherein the powder tamping and removal device comprises a third motor, a third detecting device, a second spring, a powder tamper, a flat scraper, and a waste storage bin; wherein the third motor is connected to the powder tamper, and the second spring is mounted around the powder tamper; wherein the third motor is used for driving the powder tamper to move upward or downward; wherein the third detecting device is used for detecting whether the powder tamper is in place or not; wherein the second spring is used for buffering a pressure exerted by the third motor on the powder tamper; wherein the flat scraper is used for removing redundant coffee powder outside the coffee cup; and wherein the waste storage bin is used for storing discarded coffee powder.

7. The automatic coffee grinding capsule making machine of claim 6, wherein the coffee cap unloading device comprises a fourth motor, a fourth detecting device, a push rod, a coffee cap tray, and a sliding track; wherein the fourth motor drives the push rod and causes a coffee cap to move along the sliding track and cap the coffee cup; and wherein the fourth detecting device is used for detecting whether there is a coffee cap on the coffee cap tray or not.

8. The automatic coffee grinding capsule making machine of claim 7, wherein the capping device comprises a drum, a roller, a third spring and a connection device; and wherein the roller is provided at both ends of the drum, and the roller is connected to the connection device via the third spring.

9. The automatic coffee grinding capsule making machine of claim 8, wherein the drum comprises a first drum and a second drum; wherein the first drum covers an outside of the second drum; wherein the first drum is made of soft rubber; wherein the second drum is made of hard rubber; and wherein when the coffee cap caps the coffee cup, the capping device presses the coffee cap.

10. The automatic coffee grinding capsule making machine of claim 1, wherein the coffee cup unloading device comprises a fifth motor, a fifth detecting device, an unloading mechanism, and a coffee cup tray; wherein via the unloading mechanism, the fifth motor pushes the coffee cup on the coffee cup tray to fall into one of the first holes; and wherein the fifth detecting device is used for detecting whether there is a coffee cup on the coffee cup tray or not.

* * * * *